(12) United States Patent
Xu

(10) Patent No.: US 9,547,200 B2
(45) Date of Patent: Jan. 17, 2017

(54) LIQUID CRYSTAL DISPLAY PANEL AND MANUFACTURING METHOD THEREOF, AND A DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventor: Rui Xu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 255 days.

(21) Appl. No.: 14/344,550

(22) PCT Filed: Apr. 10, 2013

(86) PCT No.: PCT/CN2013/074015
§ 371 (c)(1),
(2) Date: Mar. 12, 2014

(87) PCT Pub. No.: WO2014/127566
PCT Pub. Date: Aug. 28, 2014

(65) Prior Publication Data
US 2015/0338695 A1    Nov. 26, 2015

(30) Foreign Application Priority Data
Feb. 20, 2013    (CN) .......................... 2013 1 0054712

(51) Int. Cl.
*G02F 1/1335* (2006.01)
*G06F 3/042* (2006.01)
(Continued)

(52) U.S. Cl.
CPC ....... *G02F 1/13394* (2013.01); *G02F 1/13338* (2013.01); *G02F 1/13439* (2013.01);
(Continued)

(58) Field of Classification Search
CPC .............. G02F 1/13338; G02F 1/13439; G02F 2001/13398
(Continued)

(56) References Cited

U.S. PATENT DOCUMENTS 8,842,227 B2 *   9/2014   Kim ................... G02F 1/13338
                                                            345/174
9,146,412 B2 *   9/2015   Abe ...................... G06F 3/0418
(Continued)

FOREIGN PATENT DOCUMENTS

CN    101598867 A    12/2009
CN    203084384 U    7/2013

OTHER PUBLICATIONS

International Preliminary Report on Patentability issued Aug. 25, 2015; PCT/CN2013/074015.
(Continued)

*Primary Examiner* — Hoan C Nguyen
(74) *Attorney, Agent, or Firm* — Ladas & Parry LLP

(57) ABSTRACT

A liquid crystal display panel and a manufacturing method thereof, and a display device are provided. The liquid crystal display panel includes a first substrate and a second substrate assembled to form a cell, first spacers for supporting a liquid crystal cell gap being provided between the first substrate and the second substrate, wherein a plurality of second spacers are further formed on a surface of the first substrate that is close to the second substrate; separated first electrodes and second electrodes are formed on one of a surface of the second spacers and a surface of the second substrate corresponding to the second spacers, the first electrodes and
(Continued)

the second electrodes having different potentials; third electrodes are formed on the other of a surface of the second spacers and a surface of the second substrate corresponding to the second spacers.

10 Claims, 9 Drawing Sheets

(51) Int. Cl.
*G02F 1/1339* (2006.01)
*G02F 1/1343* (2006.01)
*G02F 1/1333* (2006.01)
*G06F 3/041* (2006.01)

(52) U.S. Cl.
CPC .. *G06F 3/0412* (2013.01); *G02F 2001/13398* (2013.01); *G02F 2201/12* (2013.01)

(58) Field of Classification Search
USPC .......................................................... 349/12
See application file for complete search history.

(56) References Cited

U.S. PATENT DOCUMENTS

| | | | |
|---|---|---|---|
| 2010/0194710 A1* | 8/2010 | Koito | G06F 3/047 345/174 |
| 2013/0009908 A1* | 1/2013 | Kuo | G06F 3/045 345/174 |

OTHER PUBLICATIONS

Third Chinese Office Action dated Sep. 24, 2015; Appln. No. 201310054712.7.
First Chinese Office Action dated Dec. 2, 2014; Appln. No. 201310054712.7.
International Search Report mailed Nov. 28, 2013; PCT/CN2013/074015.
Second Chinese Office Action Appln. No. 201310054712.7; Dated Apr. 20, 2015.

\* cited by examiner

LIQUID CRYSTAL DISPLAY PANEL AND MANUFACTURING METHOD THEREOF, AND A DISPLAY DEVICE

FIELD OF THE INVENTION

The present disclosure relates to a display technology, particularly to a liquid crystal display panel and a manufacturing method thereof, and a display device.

BACKGROUND

At present, as a bridge for connecting users and electronic equipments, touch technology has been gradually applied to mobile telephones, tablet computers, automatic teller machines and other electronic display devices that include liquid crystal displays.

Depending on locations of touch sensors, liquid crystal display panels with touch function are generally classified into on cell touch panels and in cell touch panels. At present, on cell touch panels are relatively more common in the market, which realize touch function by adding touch structures on surface of the display panels. Since the display panel structure is not required to change, such a structure is easy to implement. However, on cell touch panels generally have a large cell gap, light transmission rate is difficult to guarantee, and thus most on cell touch panels cannot realize multi-point touch function. Therefore, the industry has turned to in cell touch panels which have thinner cell gap and higher light transmission rate.

In existing in cell touch panels, in order to obtain touch locations of users, it is generally required to provide X and Y coordinate determining structures for touching on the array substrate, which are implemented by design and connection of metal lines. Due to process factors, spacing need to be left in regions that metal lines are arranged on. Metal line regions are generally very large. Enlargement of metal line regions would increase frame width of displays. On the other hand, in order to prevent light from influencing electric field generated by metal lines, metal line regions need to be covered by black matrix, which will influence opening ratio of a display panel to some extent. It is difficult for prior art to address the above problems.

SUMMARY

Embodiments of the present invention provide a liquid crystal display panel and a manufacturing method thereof, and a display device, which can reduce metal line regions on the array substrate and hence reducing frame width of a display and improving opening ratio of the display panel.

In order to achieve the above-mentioned effects, embodiments of the present invention are provided as follows.

One aspect of embodiments of the present invention provides a liquid crystal display panel comprising: a first substrate and a second substrate assembled to form a cell, first spacers for supporting a liquid crystal cell gap being provided between said first substrate and said second substrate, wherein a plurality of second spacers are further formed on a surface of said first substrate that is close to said second substrate, a height of said second spacers being smaller than a height of said first spacers;

separated first electrodes and second electrodes are formed on one of a surface of said second spacers and a surface of said second substrate corresponding to said second spacers, said first electrodes and said second electrodes having different potentials;

third electrodes are formed on the other of the surface of said second spacers and the surface of said second spacer corresponding to said second spacers such that said third electrodes do not contact said first electrodes and said second electrodes when no touch operation is conducted; and said third electrodes contact said first electrodes and said second electrodes when a touch operation is conducted.

Another aspect of embodiments of the present invention provides a display device including the above-described liquid crystal display panel.

Yet another aspect of embodiments of the present invention provides a manufacturing method of a liquid crystal display panel including the steps of:

forming first spacers on a surface of a first substrate or a second substrate, and forming second spacers on a surface of said first substrate, a height of said second spacers being smaller than a height of said first spacers;

forming separated first electrodes and second electrodes on one of a surface of said second spacers and a surface of said second substrate corresponding to said second spacers;

forming third electrodes on another of a surface of said second spacers and a surface of said second substrate corresponding to said second spacers;

assembling said first substrate and said second substrate to form a cell such that said third electrodes do not contact said first electrodes and said second electrodes when no touch operation is conducted; and said third electrodes contact said first electrodes and said second electrodes when a touch operation is conducted.

In the liquid crystal display panel and the manufacturing method thereof, and the display device provided in embodiments of the present invention, separated first electrodes and second electrodes are formed on the surface of a substrate, third electrodes corresponding to the first electrodes and second electrodes are formed on a surface of the other substrate, wherein the first electrodes and said second electrodes have different potentials, and the third electrodes do not contact the first electrodes and the second electrodes when no touch operation is conducted. When a user conducts touch operation, the third electrodes will connect and conduct the first electrodes and the second electrodes, thereby making potentials of the second electrodes and the third electrodes to change, and coordinates of the touch point can be determined depending on electrodes' potential variation. Thus, it is avoided to manufacture one set of the two sets of metal lines for determining lateral and longitudinal coordinates on the array substrate, which can effectively reduce metal line regions on the array substrate, thereby reducing frame width of the display and improving opening ratio of the display panel.

BRIEF DESCRIPTION OF DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAIL DESCRIPTION

The technical solution of the embodiments of the present invention will be described clearly and completely below with reference to the drawings of the present invention. It should be understood that the described embodiments are only a part of embodiments, but not all embodiments of the present invention. Based on the embodiments in the present invention, all other embodiments that can be obtained by those skilled in the art will fall within the protection scope of the present invention.

Unless otherwise defined, all the technical and scientific terms used herein have the same meanings as commonly understood by one of ordinary skill in the art to which the present invention belongs. The terms such as "a," "an," or "the" etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
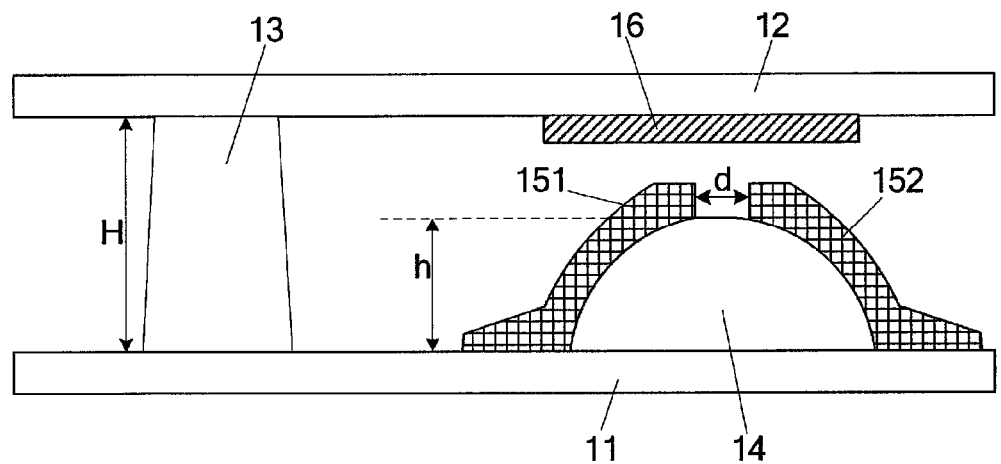
FIG. 1 is a structural representation of the liquid crystal display panel provided in the embodiments of the present invention.

As shown in FIG. 1, the liquid crystal display panel provided in the embodiments of the present invention comprises: a first substrate 11 and a second substrate 12 forming a cell, between which first spacers 13 are provided for supporting the liquid crystal cell gap.

A plurality of second spacers 14 are further formed on a surface of the first substrate 11 that is closer to the second substrate 12, the second spacers 14 having a height h smaller than the height h of the first spacers 13.

First electrodes 151 and second electrodes 152 are separately formed on one of the surface of the second spacers 14 and the surface of the second substrate 12 that corresponds to the second spacers 14, wherein the first electrodes 151 and second electrodes 152 have different potentials. As an example, in the liquid crystal display panel as shown in FIG. 1, description is given with respect to an example in which first electrodes 151 and second electrodes 152 are formed on the surface of the second spacers 14.

Third electrodes 16 are formed on the other of the surface of second spacers 14 and the surface of the second substrate 12 that corresponds to the second spacers 14 such that the third electrodes 16 do not contact the first electrodes 151 and the second electrodes 152 when no touch operation is conducted; and the third electrodes 16 contact the first electrodes 151 and the second electrodes 152 when conducting touch operation. Referring again to the liquid crystal display panel as shown in FIG. 1, description is given with respect to an example in which the third electrodes 16 are formed on the surface of the second substrate 12 that corresponds to the second spacers 14.

With the liquid crystal display panel provided in the embodiments of the present invention, first electrodes and second electrodes are separately formed on a surface of a substrate and third electrodes corresponding to first electrodes and second electrodes are formed on a surface of the other substrate, wherein the first electrodes and the second electrodes have different potentials, and the third electrodes do not contact the first electrodes and the second electrodes when no touch operation is conducted. When a user conducts a touch operation, the third electrodes will connect and conduct the first electrodes and the second electrodes, thereby making potentials of the second electrodes and the third electrodes to change, and coordinates of the touch point can be determined depending on electrodes' potential variation. Thus, one set of the two sets of metal lines for determining lateral and longitudinal coordinates on the array substrate may be omitted, and this can effectively reduce metal line regions on the array substrate, thereby reducing frame width of the display and improving opening ratio of the display panel.

For example, the first electrodes 151 may be spaced from the second electrodes 152 by 4-6 μm. Such a size of electrode structure may be obtained with prior art patterning process.

The first substrate 11 may be an array substrate, and the second substrate 12 may be a color filter substrate; or otherwise, the first substrate 11 may be a color filter substrate and the second substrate 12 may be an array substrate.

In the embodiments of the present invention, description is given with an example in which the first substrate 11 is the array substrate and the second substrate 12 is the color filter substrate. It should be understood that, in the liquid crystal display panel provided in the embodiments of the present invention, as an alternative, the second substrate 12 may also be used as the array substrate, which is not limited in the present invention.

Figure 2:
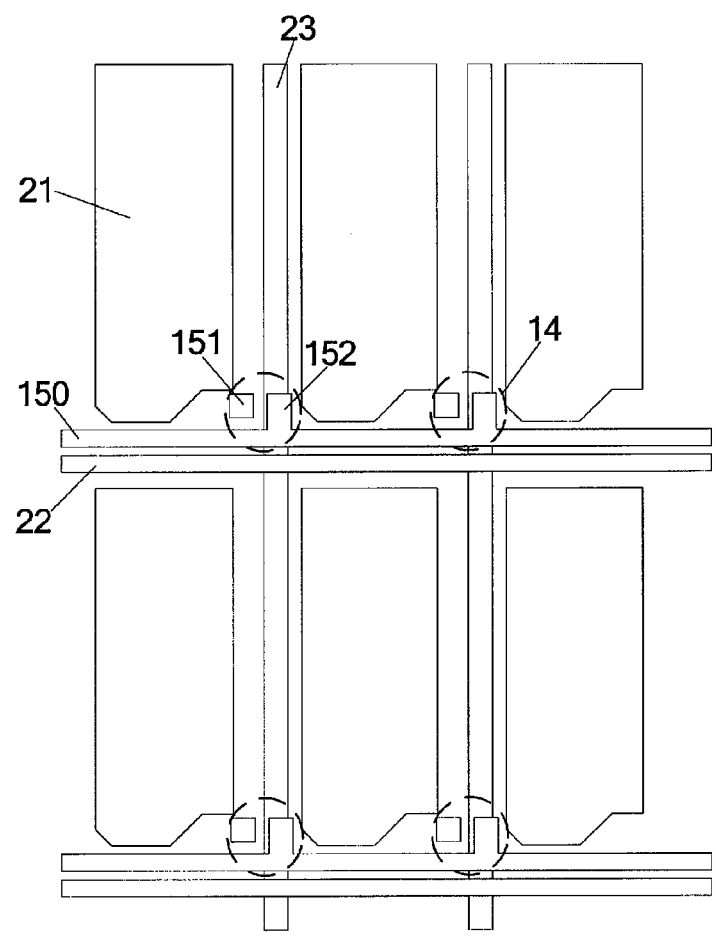
FIG. 2 is a structural representation of an array substrate of the liquid crystal display panel provided in the embodiments of the present invention.

When the first substrate 11 is the array substrate, as shown in FIG. 2, the first substrate 11 may include a plurality of pixel units 21 arranged in matrix, a plurality of rows of gate lines 22 laterally arranged corresponding to pixel units 21 and a plurality of columns of data lines 23 longitudinally arranged.

Furthermore, each pixel unit 21 may correspond to one second spacer 14, and this second spacer 14 may be located at the intersection between a gate line 22 and a data line 23. Thus, the number of the second spacers 14 is guaranteed, hence the precision of control is guaranteed, and at the same time no existing black matrix region needs to be added for the second spacers 14 at intersections of gate lines 22 and data lines 23, and thereby the opening ratio of the liquid crystal display panel will be effectively guaranteed.

In an embodiment, the first electrodes 151 may be electrically connected, for example, with the common electrode layer (not shown in FIG. 2). Since the common electrode layer is continuously energized, the first electrodes 151 can have stable potential, and the second electrodes 152 and the third electrodes 16 may be in non-energized state when there is no touch operation during practical use of the liquid crystal display panel. Thus, when the user conducts a touch operation, the third electrodes 16 on the color filter substrate 12 contact the first electrodes 151 and the second electrodes 152 that are formed on the second spacers 14 disposed on the array substrate so that the second electrodes 152 and the third electrodes 16 switch from a non-energized state to a energized state. It is therefore possible to determine coordinates of the touch location depending on two signals of the second electrodes 152 and the third electrodes 16, hence realizing in cell touch function. As an alternative, the first electrodes 151 may also be connected with gate lines or data lines, thereby making first electrodes 151 to have respective potential when providing signals to gate lines or data lines. Since the touch time is generally greater than the scanning time of one frame, in the time of that frame involved by the touch, it is also possible to make the first electrodes 151 to have a certain potential, thereby being used for determine coordinates of the touch location. Thus, it is possible to realize in cell touch function without adding wirings on the array substrate, which further improves opening ratio of the liquid crystal display panel.

The in cell touch panel provided in the embodiments of the present invention may be broadly applied to production of liquid crystal display devices, such as, AD-SDS (Advanced-Super Dimensional Switching), IPS (In Plane Switch) or TN (Twist Nematic) types and etc. Each type of the above-mentioned liquid crystal display devices may include a color filter substrate and a array substrate forming a cell. The difference is that, common electrodes of the TN type display device are disposed on the color filter substrate, and pixel electrodes are disposed on the array substrate; common electrodes and pixel electrodes of the ADS type display device and IPS type display device are both disposed on the array substrate.

In the embodiments of the present invention, description is given with an example in which common electrodes and pixel electrodes are both disposed on the array substrate, wherein the second spacers 14 are disposed on the array substrate (as shown in FIG. 2), and the first electrodes 151 on the surface of the second spacers 14 are electrically connected with the common electrode layer on the array substrate. When the second spacers 14 are disposed on the color filter substrate, the first electrodes 151 on the surface of second spacers 14 may be electrically connected with the common electrode layer on the array substrate. In this time, the common electrodes and the pixel electrodes are disposed on different substrates.

Figure 3:
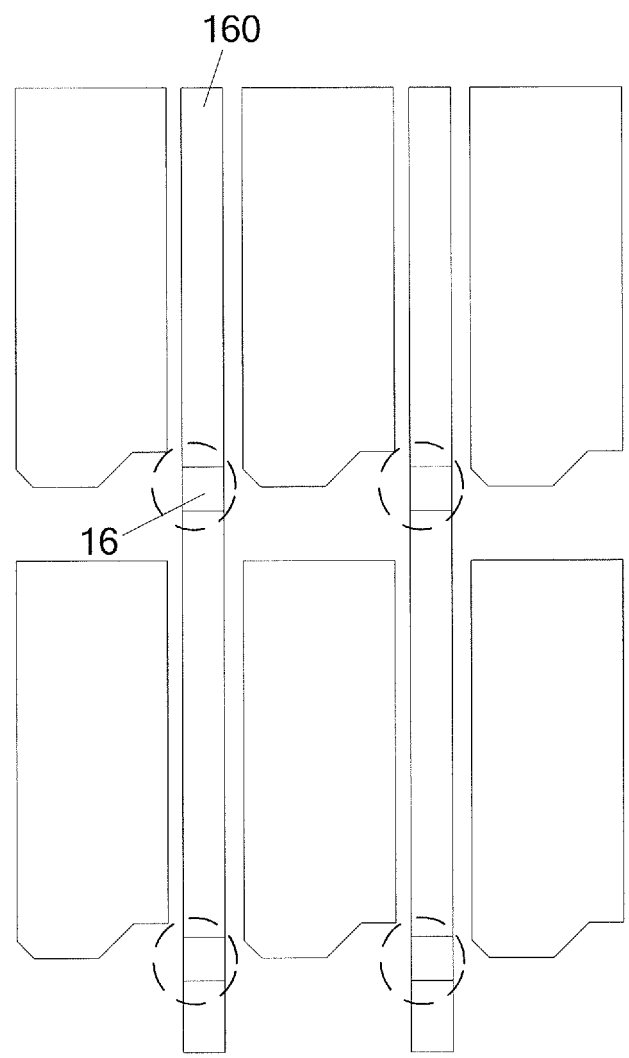
FIG. 3 is a structural representation of a color filter substrate of the liquid crystal display panel provided in the embodiments of the present invention.

Furthermore, as shown in FIG. 2, the second electrodes 152 in one row may be connected with a same second electrode line 150. In the embodiments of the present invention, the first substrate 11 is the array substrate. Thus, each second electrode line 150 corresponds to a longitudinal axis coordinate, and thereby the longitudinal coordinate of the touch may be determined according to signals on the second electrode lines 150. At the same time, the third electrodes 16 in one column may all be connected with a same third electrode line 160. In the embodiments of the present invention, the second substrate 12 is the color filter substrate having a structure as shown in FIG. 3. Thus, each third electrode line 160 corresponds to a lateral axis coordinate, and thereby the lateral coordinate of the touch may be determined according to signals on the third electrode lines 160. With the liquid crystal display panel of such structure, lateral and longitudinal coordinates of the touch location may be determined according to the two signals of the second electrode line 150 and the third electrode line 160, hence realizing in cell touch function.

Figure 4:
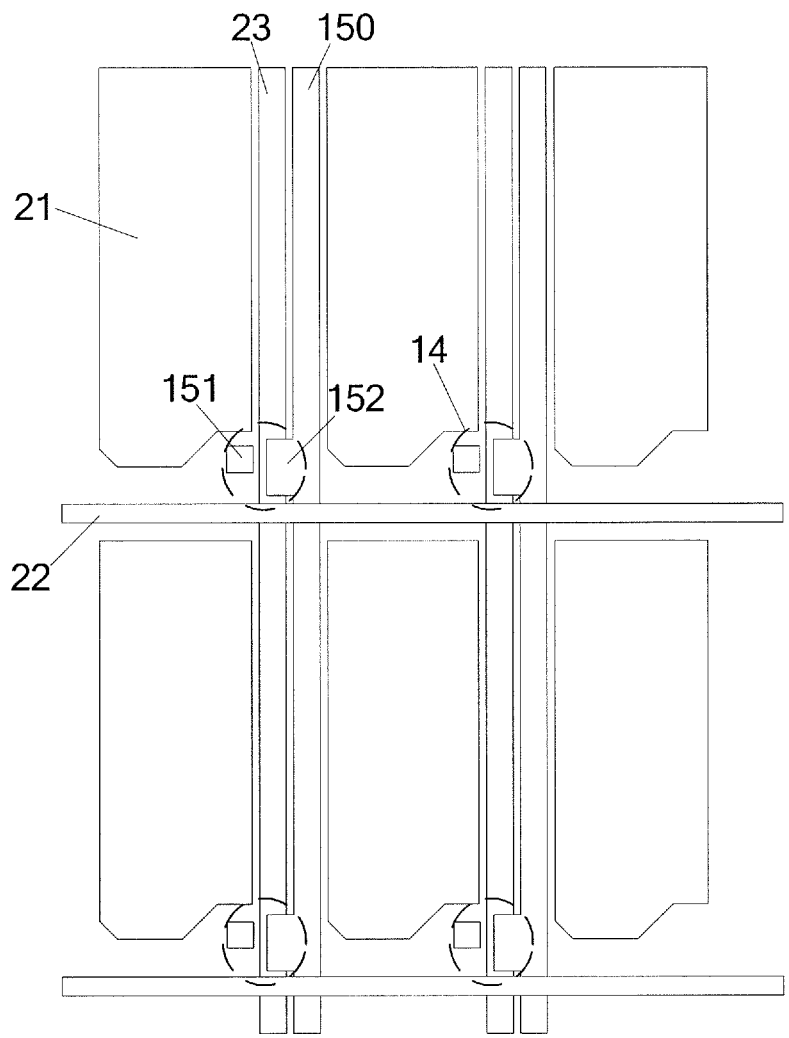
FIG. 4 is a structural representation of an array substrate of another liquid crystal display panel provided in the embodiments of the present invention.
Figure 5:
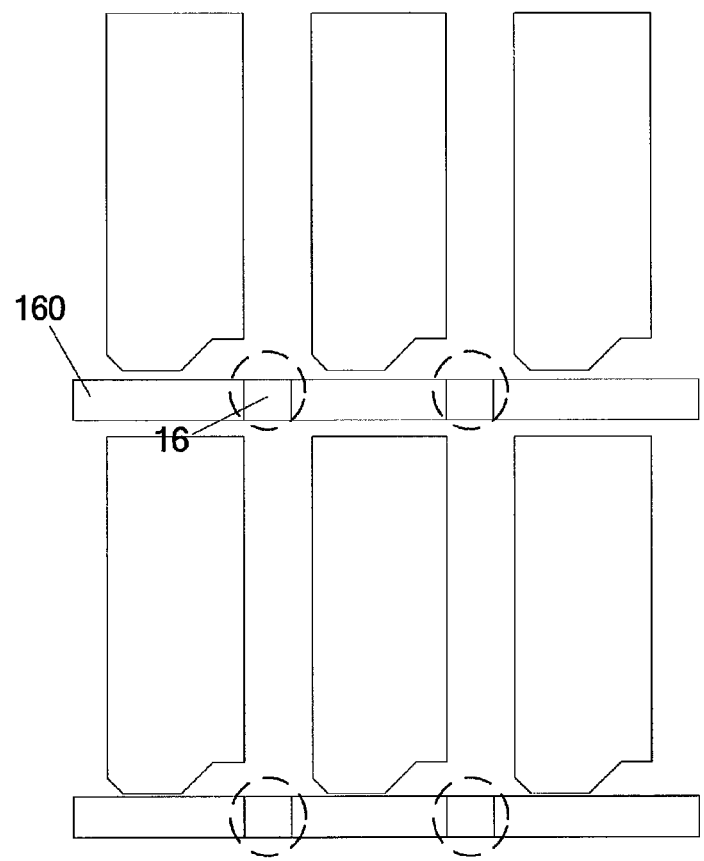
FIG. 5 is a structural representation of a color filter substrate of another liquid crystal display panel provided in the embodiments of the present invention.

Alternatively, as shown in FIG. 4, the second electrodes 152 in the same column may be connected with the same second electrode line 150. In the embodiments of the present invention, the first substrate 11 is the array substrate. Thus, each second electrode line 150 corresponds to a lateral axis coordinate, and thereby the lateral coordinate of the touch may be determined according to signals on the second electrode lines 150. At the same time, the third electrodes 16 in the same column may all be connected with the same third electrode line 160. In the embodiments of the present invention, the second substrate 12 is the color filter substrate having a structure as shown in FIG. 5. Thus, each third electrode line 160 corresponds to a longitudinal axis coordinate, and thereby the longitudinal coordinate of the touch may be determined according to signals on the third electrode lines 160. With such a structure of the liquid crystal display panel, the lateral and longitudinal coordinates of the touch location may be determined according to two signals of the second electrode line 150 and the third electrode line 160, hence realizing in cell touch function.

With the liquid crystal display panel provided in the embodiments of the present invention, one set of the two sets of metal lines for determining lateral and longitudinal coordinates on the array substrate may be omitted, and this may effectively reduce metal line regions on the array substrate, and thus reduce frame width of the display and improving opening ratio of the display panel.

Figure 6:
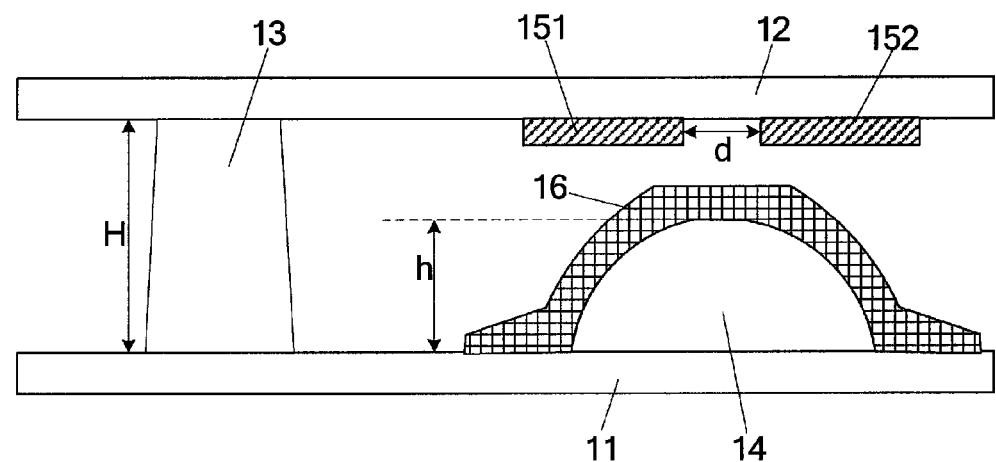
FIG. 6 is a structural representation of another liquid crystal display panel provided in the embodiments of the present invention.

Embodiments of the present invention further provide a liquid crystal display panel as shown in FIG. 6, including: a first substrate 11 and a second substrate 12 forming a cell, with first spacers 13 for supporting the liquid crystal cell gap formed therebetween.

Similar to the aforementioned embodiments, a plurality of second spacers 14 are formed on a surface of the first substrate 11 that is close to the second substrate 12. The second spacers 14 have a height h smaller than the height H of the first spacers 13.

Unlike the aforementioned embodiments, in the liquid crystal display panel as shown in FIG. 6, description is given with respect to an example in which the third electrodes 16 are formed on the surface of the second spacers 14, and the first electrodes 151 and the second electrodes 152 are formed on the surface of the second substrate 12 that corresponds to the second spacers 14. The first electrodes 151 and second electrodes 152 are separately formed on the surface of the second substrate 12 that corresponds to the second spacers 14, wherein the first electrodes 151 and second electrodes 152 have different potentials.

Third electrodes 16 are formed on the surface of the second spacers 14, which do not contact the first electrodes 151 and the second electrodes 152 when no touch operation is conducted and contact the first electrodes 151 and the second electrodes 152 when a touch operation is conducted.

With the liquid crystal display panel provided in the embodiments of the present invention, first electrodes and second electrodes are separately formed on a surface of a substrate, and third electrodes corresponding to first electrodes and second electrodes are formed on a surface of the other substrate, wherein the first electrodes and the second electrodes have different potentials, and the third electrodes do not contact the first electrodes and the second electrodes when no touch operation is conducted. When a user conducts a touch operation, the third electrodes will connect and conduct the first electrodes and the second electrodes so that the potentials of the second electrodes and the third electrodes are changed, and then coordinates of the touch point can be determined depending on potential variations of those electrodes. Thus, one set of the two sets of metal lines for determining lateral and longitudinal coordinates on the array substrate may be omitted, and metal line regions on the array substrate can be effectively reduced, thereby reducing frame width of the display and improving opening ratio of the display panel.

For example, the spacing d between the first electrodes 151 and the second electrodes 152 may be 4-6 µm. Electrode structures of such a size may be obtained with prior art patterning process.

The first substrate 11 may be an array substrate, the second substrate 12 may be a color filter substrate; or alternatively, the first substrate 11 may be a color filter substrate and the second substrate 12 may be an array substrate.

Figure 7:
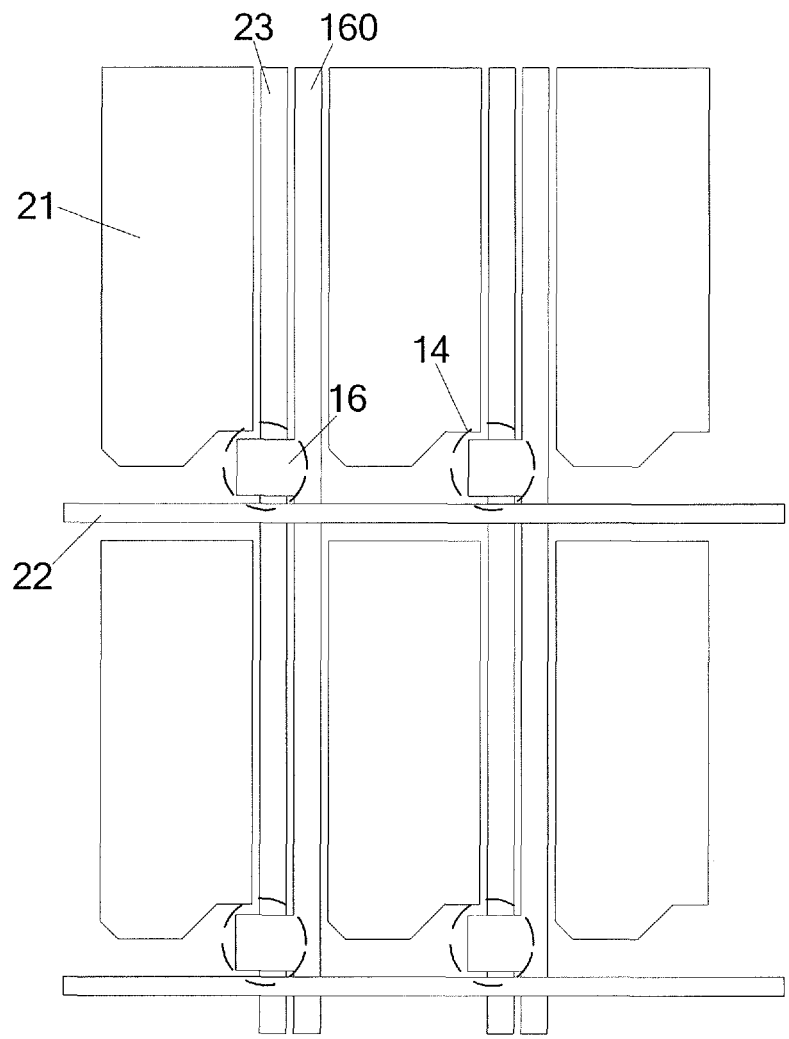
FIG. 7 is a structural representation of an array substrate of another liquid crystal display panel provided in the embodiments of the present invention.

In the embodiments of the present invention, description is given with an example in which the first substrate 11 is the array substrate and the second substrate 12 is the color filter substrate. It should be understood that in the liquid crystal display panel provided in the embodiments of the present invention, alternatively, the second substrate 12 may be the array substrate, which is not limited in the present invention. When the first substrate 11 is the array substrate, as shown in FIG. 7, the first substrate 11 may include a plurality of pixel units 21 arranged in matrix, a plurality of rows of gate lines 22 laterally arranged and a plurality of columns of data lines longitudinally arranged corresponding to pixel units 21.

Furthermore, each pixel unit 21 may correspond to one of the second spacers 14, and that one second spacer 14 may be located at the intersection between a gate line 22 and a data line 23. Thus, the number of the second spacers 14 is guaranteed, hence the precision of control is guaranteed, and at the same time no existing black matrix region needs to be added for the second spacers 14 at intersections of gate lines 22 and data lines 23, thereby effectively guaranteeing opening ratio of the liquid crystal display panel.

The first electrodes 151 may be, for example, electrically connected with the common electrode layer. Since the common electrode layer is continuously energized, the first electrodes 151 can have stable potential and during practical use of the liquid crystal display panel, the second electrodes 152 and the third electrodes 16 may be in non-energized state when there is no touch operation. In this way, when a user conducts touch operation, the first electrodes 151 and the second electrodes 152 on the color filter substrate 12 are conducted with the third electrodes 16 formed on the second spacers 14 of the array substrate, so that both the second electrodes 152 and the third electrodes 16 switch into energized state from non-energized state. It is therefore possible to determine the coordinates of the touch location depending on the two signals of the second electrodes 152 and the third electrodes 16, hence realizing in cell touch function.

The in cell touch panel provided in the embodiments of the present invention may be broadly applied to production of, for example, AD-SDS (Advanced-Super Dimensional Switching), IPS (In Plane Switch) or TN (Twist Nematic) types liquid crystal display devices. Whatever type of the above-mentioned liquid crystal display devices, it should include a color filter substrate and a array substrate forming a cell. The difference is that, common electrodes of the TN type display device are disposed on the color filter substrate, and pixel electrodes are disposed on the array substrate; while common electrodes and pixel electrodes of the ADS type display device and IPS type display device are both disposed on the array substrate.

Figure 8:
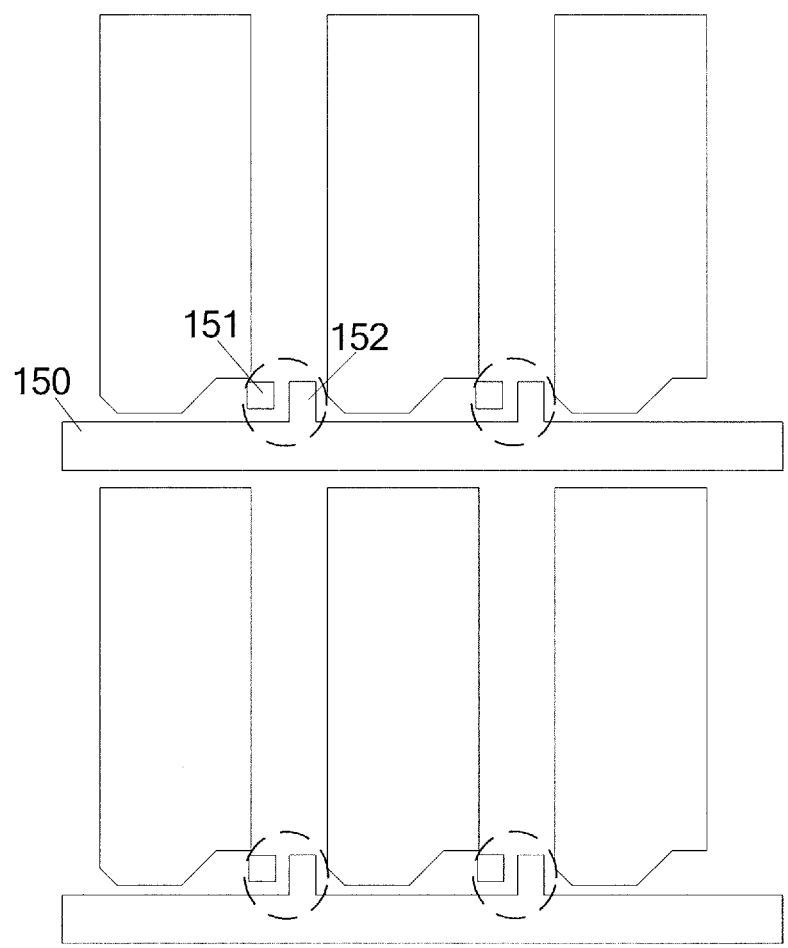
FIG. 8 is a structural representation of a color filter substrate of another liquid crystal display panel provided in the embodiments of the present invention.

In the embodiments of the present invention, description is given with an example in which common electrodes and pixel electrodes are disposed on the color filter substrate and the array substrate, respectively, wherein the second spacers 14 are disposed on the array substrate (as shown in FIG. 7), and the first electrodes 151 disposed on the surface of the color filter substrate are electrically connected with the common electrode layer disposed on the color filter substrate, as shown in FIG. 8. When the second spacers 14 are disposed on the color filter substrate, the first electrodes 151 are located on the array substrate, and the first electrodes 151 may be electrically connected with the common electrode layer on the array substrate. Now, the common electrodes and the pixel electrodes are disposed on different substrates.

Furthermore, as shown in FIG. 8, the second electrodes 152 in the same row may be connected with the same second electrode line 150. In the embodiments of the present invention, the second substrate 12 is the color filter substrate. Thus, each second electrode line 150 corresponds to a longitudinal axis coordinate, thereby longitudinal coordinate of the touch location may be determined according to signals on the second electrode lines 150. At the same time, the third electrodes 16 in the same column may all be connected with the same third electrode line 160. In the embodiments of the present invention, the first substrate 11 is the array substrate, as shown in FIG. 7. Thus, each of the third electrode lines 160 corresponds to a lateral axis coordinate, and thereby the lateral coordinate of the touch location may be determined according to signals on the third electrode lines 160. With the liquid crystal display panel of such a structure, lateral and longitudinal coordinates of the touch location may be determined according to two signals of the second electrode line 150 and the third electrode line 160, hence realizing in cell touch function.

Figure 9:
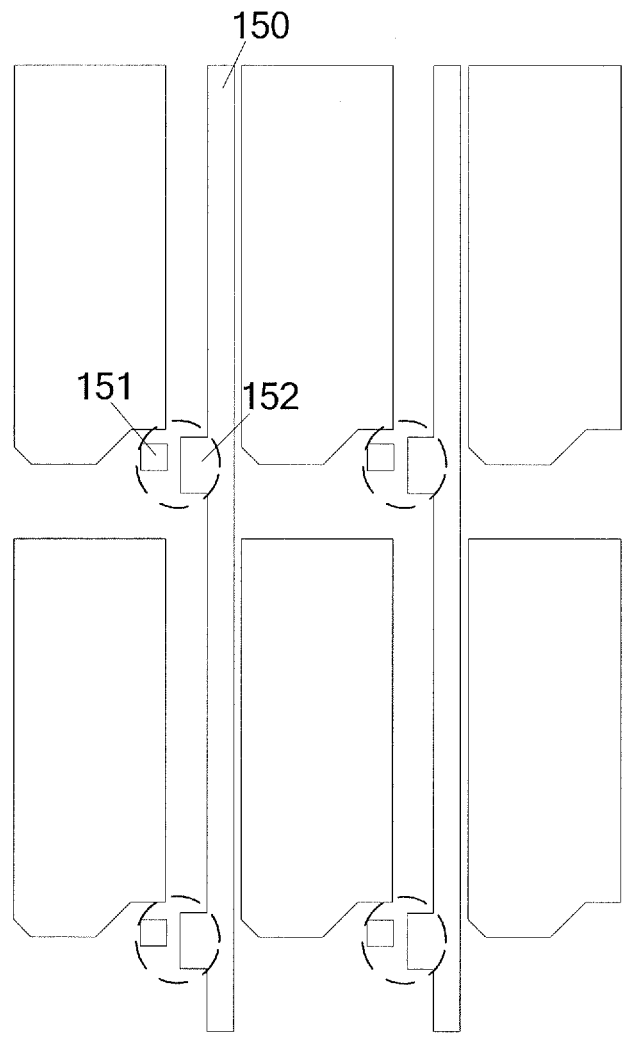
FIG. 9 is a structural representation of a color filter substrate of yet another liquid crystal display panel provided in the embodiments of the present invention.
Figure 10:
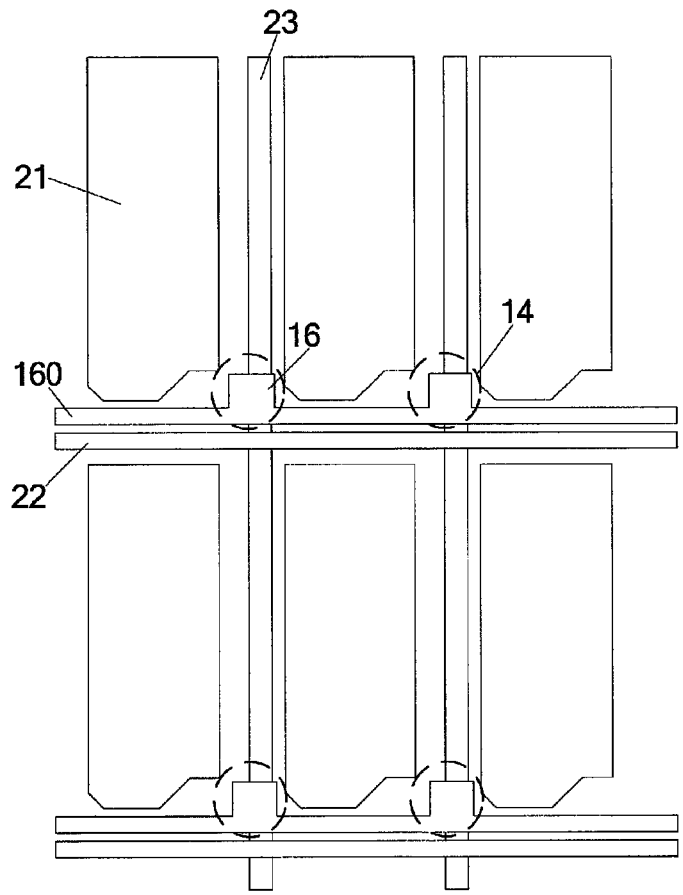
FIG. 10 is a structural representation of an array substrate of yet another liquid crystal display panel provided in the embodiments of the present invention.

Alternatively, as shown in FIG. 9, the second electrodes 152 in the same column may be connected with the same second electrode line 150. In the embodiments of the present invention, the second substrate 12 is the color filter substrate. Thus, each second electrode line 150 corresponds to a lateral axis coordinate, and thereby the lateral coordinate of the touch location may be determined according to signals on the second electrode lines 150. At the same time, the third electrodes 16 in the same column may all be connected with the same third electrode line 160. In the embodiments of the present invention, the first substrate 11 is the array substrate, as shown in FIG. 10. Thus, each of the third electrode lines 160 corresponds to a longitudinal axis coordinate, and thereby the longitudinal coordinate of the touch location may be determined according to signals on the third electrode lines 160. With the liquid crystal display panel of such a structure, the lateral and longitudinal coordinates of the touch location may be determined according to two signals of the second electrode line 150 and the third electrode line 160, hence realizing in cell touch function.

In the liquid crystal display panel provided in the embodiments of the present invention, one set of the two sets of metal lines for determining lateral and longitudinal coordinates on the array substrate may be omitted, and thereby metal line regions on the array substrate may be effectively reduced, and thus the frame width of the display will be reduced and the opening ratio of the display panel will be improved.

Embodiments of the present invention further provide a display device including any of the above-described liquid crystal display panels. Said display devices may be any products or parts with display function, such as, mobile telephones, tablet computers, televisions, displays, notebook computers, cameras, video cameras, digital picture frames and navigators, and etc.

The display device provided in the embodiments of the present invention includes a liquid crystal display panel. In the liquid crystal display panel, first electrodes and second electrodes are separately formed on the surface of a substrate, and third electrodes corresponding to the first electrodes and second electrodes are formed on a surface of the other substrate, wherein the first electrodes and the second electrodes have different potentials, and the third electrodes do not contact the first electrodes and the second electrodes when no touch operation is conducted. When a user conducts a touch operation, the third electrodes will connect and conduct the first electrodes and the second electrodes, so that potentials of the second electrodes and the third electrodes are change, and thus the coordinates of the touch point can be determined depending on electrodes' potential variation. Thus, one set of the two sets of metal lines for determining lateral and longitudinal coordinates on the array substrate can be omitted, which can effectively reduce metal line regions on the array substrate, thereby reducing frame width of the display and improving opening ratio of the display panel.

Figure 11:
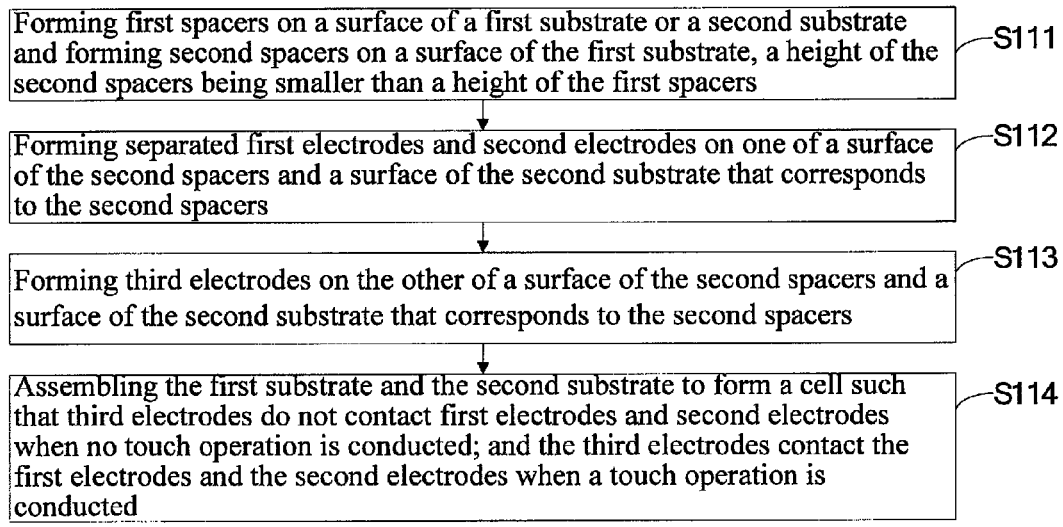
FIG. 11 is a flow chart of a manufacturing method of a liquid crystal display panel provided in the embodiments of the present invention.

As shown in FIG. 11, the liquid crystal display panel manufacturing method provided in the embodiments of the present invention includes the following steps:

S111: forming first spacers on a surface of a first substrate or a second substrate and forming second spacers on a surface of the first substrate, a height of the second spacers being smaller than a height of the first spacers;

S112: forming separated first electrodes and second electrodes on one of a surface of the second spacers and a surface of the second substrate that corresponds to the second spacers;

S113: forming third electrodes on the other of a surface of the second spacers and a surface of the second substrate that corresponds to the second spacers;

S114: assembling the first substrate and the second substrate to form a cell such that third electrodes do not contact first electrodes and second electrodes when no touch operation is conducted; and the third electrodes contact the first electrodes and the second electrodes when a touch operation is conducted.

In the liquid crystal display panel manufacturing method provided in the embodiments of the present invention, the first electrodes and second electrodes are separately formed on the surface of a substrate, and the third electrodes corresponding to the first electrodes and second electrodes are formed on a surface of the other substrate, wherein the first electrodes and the second electrodes have different potentials, and the third electrodes do not contact the first electrodes and the second electrodes when no touch operation is conducted. When a user conducts a touch operation, the third electrodes will connect and conduct the first electrodes and the second electrodes, thereby causing potentials of the second electrodes and the third electrodes to change, and the coordinates of the touch point can be determined depending on electrodes' potential variation. Thus, it is avoided to manufacture one set of the two sets of metal lines for determining lateral and longitudinal coordinates on the array substrate, and this can effectively reduce metal line regions on the array substrate, thereby reducing frame width of the display and improving opening ratio of the display panel.

For example, the spacing d between the first electrodes and the second electrodes may be 4-6 μm. Electrode structures of such a size may be obtained with prior art patterning process.

The first substrate may be an array substrate, the second substrate may be a color filter substrate; or the first substrate may be a color filter substrate, and the second substrate may be the array substrate.

In the embodiments of the present invention, description is given with an example in which the first substrate is the array substrate and the second substrate is the color filter substrate. It should be understood that in the liquid crystal display panel provided in the embodiments of the present invention, the second substrate may also be used as the array substrate, which is not limited in the present invention.

When the first substrate is the array substrate, as shown in FIG. 2, the first substrate 11 may include a plurality of pixel units 21 arranged in matrix, a plurality of rows of gate lines 22 laterally arranged and a plurality of columns of data lines longitudinally arranged corresponding to pixel units 21.

The in cell touch panel provided in the embodiments of the present invention may be broadly applied to production of for example AD-SDS (Advanced-Super Dimensional Switching), IPS (In Plane Switch) or TN (Twist Nematic) types liquid crystal display devices. Whatever type of the above-mentioned liquid crystal display devices, it should include a color filter substrate and a array substrate forming a cell. The difference is that common electrodes of the TN type display device are disposed on the color filter substrate, and pixel electrodes are disposed on the array substrate; common electrodes and pixel electrodes of the ADS type display device and IPS type display device are both disposed on the array substrate.

In the embodiments of the present invention, description is given with an example in which common electrodes and pixel electrodes are both disposed on the array substrate, wherein the second spacers 14 are disposed on the array substrate (as shown in FIG. 2), and the first electrodes 151 on the surface of the second spacers 14 are electrically connected with the common electrode layer on the array substrate. When the second spacers 14 are disposed on the color filter substrate, the first electrodes 151 on the surface of second spacers 14 may be electrically connected with the common electrode layer on the array substrate. Now the common electrodes and the pixel electrodes are disposed on different substrates.

Figure 12:
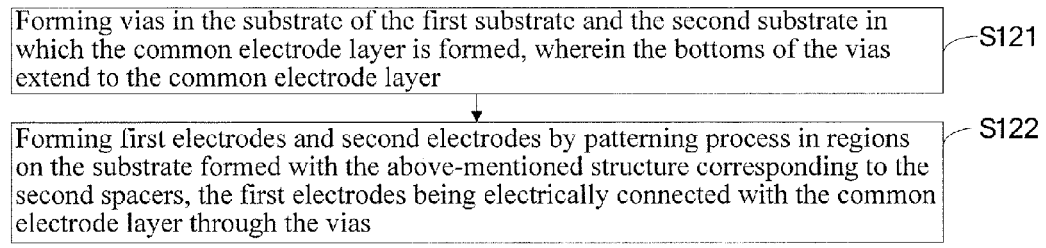
FIG. 12 is a flow chart of forming first electrodes and second electrodes in the manufacturing method of a liquid crystal display panel provided in the embodiments of the present invention.

Furthermore, as shown in FIG. 12, the step of forming separated first electrodes and second electrodes may include:

S121: forming vias in the substrate of the first substrate and the second substrate in which the common electrode layer is formed, wherein the bottoms of the vias extend to the common electrode layer.

S122: forming first electrodes and second electrodes by patterning process in regions on the substrate formed with the above-mentioned structure corresponding to the second spacers, the first electrodes being electrically connected with the common electrode layer through the vias.

For example, it is possible to form first electrodes, second electrodes and second electrode lines by one patterning process in regions on the first substrate formed with the above-mentioned structure corresponding to the second spacers; the first electrodes may be electrically connected with the common electrode layer through the vias; the second electrodes in the same row may all be connected with the same second electrode line, and longitudinal coordinate of the touch location is determined according to signals on the second electrode line. Thus, each second electrode line corresponds to a longitudinal axis coordinate, thereby longitudinal coordinate of the touch location may be determined according to signals on the second electrode lines.

Accordingly, the step of forming the third electrodes may include:

forming third electrodes and third electrode lines on the other of the surface of the second spacers and the surface of the second substrate corresponding to the second spacers, wherein the third electrodes in the same column are all connected with the same third electrode line, and lateral coordinate of the touch is determined according to signals on the third electrode line, and thus each third electrode line corresponds to a lateral axis coordinate, and thereby lateral coordinate of the touch is determined according to signals on the third electrode lines;

or alternatively, forming first electrodes, second electrodes and second electrode lines by one patterning process in regions on the first substrate formed with the abovementioned structure corresponding to the second spacers, wherein the first electrodes are electrically connected with the common electrode layer through said vias, the second electrodes in the same column are all connected with the same second electrode line, and lateral coordinate of the touch is determined according to signals on the second electrode line. Thus, each second electrode line corresponds to a lateral axis coordinate, and thereby lateral coordinate of the touch is determined according to signals on the second electrode lines.

Accordingly, the step of forming the third electrodes may include:

forming third electrodes and third electrode lines on the other of the surface of the second spacers and the surface of the second substrate corresponding to the second spacers, wherein the third electrodes in the same row are all connected with the same third electrode line, and longitudinal coordinate of the touch is determined according to signals on the third electrode line. Thus, each third electrode line corresponds to a longitudinal axis coordinate, thereby longitudinal coordinate of the touch is determined according to signals on the third electrode lines.

Alternatively, the first electrodes 151 may also be connected with gate lines or data lines, so that the first electrodes 151 have corresponding potentials when providing signals to the gate lines or the data lines. Since the touch time is generally greater than the scanning time of one frame, in the time of that frame involved by the touch, it is also possible to make the first electrodes 151 to have a certain potential, thereby being used for determine coordinates of the touch location. Thus, it is possible to realize in cell touch function without adding wirings on the array substrate, which further improves opening ratio of the liquid crystal display panel.

The liquid crystal display panel manufacturing method provided in the embodiments of the present invention may avoid manufacturing one set of the two sets of metal lines for determining lateral and longitudinal coordinates on the array substrate, thereby effectively reducing metal line regions on the array substrate, reducing frame width of the display and improving opening ratio of the display panel.

What are described above is only illustrative embodiments of the disclosure, but not limitative to the scope of the disclosure. The scopes of the disclosure are defined by the accompanying claims.

The invention claimed is:

1. A liquid crystal display panel comprising a first substrate and a second substrate assembled to form a cell, first spacers for supporting a liquid crystal cell gap being provided between said first substrate and said second substrate, wherein
   a plurality of second spacers are further formed on a surface of said first substrate that is close to said second substrate, a height of said second spacers being smaller than a height of said first spacers;
   separated first electrodes and second electrodes are formed on one of a surface of said second spacers and a surface of said second substrate corresponding to said second spacers, said first electrodes and said second electrodes having different potentials; and
   third electrodes are formed on the other of the surface of said second spacers and the surface of said second substrate corresponding to said second spacers such that said third electrodes do not contact said first electrodes and said second electrodes when no touch operation is conducted; and said third electrodes contact said first electrodes and said second electrodes when a touch operation is conducted,
   wherein said first electrodes are spaced from said second electrodes by 4-6 µm.

2. The liquid crystal display panel of claim 1, wherein said first substrate is an array substrate and said second substrate is a color filter substrate.

3. The liquid crystal display panel of claim 1, wherein said first substrate is a color filter substrate and said second substrate is an array substrate.

4. The liquid crystal display panel of claim 1, wherein said array substrate comprises a plurality of pixel units arranged in matrix, a plurality of rows of gate lines arranged laterally and a plurality of columns of data lines arranged longitudinally corresponding to said pixel units, each of said pixel units corresponds to one of said second spacers; and
   said second spacers are located at intersections of said gate lines and said data lines.

5. The liquid crystal display panel of claim 1, wherein said first electrodes are formed on the array substrate and electrically connected with said gate lines or said data lines.

6. The liquid crystal display panel of claim 2, wherein the substrate which said first electrodes are formed on comprises a common electrode layer, and said first electrodes are electrically connected with said common electrode layer.

7. The liquid crystal display panel of claim 3, wherein the substrate which said first electrodes are formed on comprises a common electrode layer, and said first electrodes are electrically connected with said common electrode layer.

8. The liquid crystal display panel of claim 1, wherein said second electrodes in a same row are all connected with a same second electrode line;

said third electrodes in a same column are all connected with a same third electrode line.

9. The liquid crystal display panel of claim 1, wherein said second electrodes in a same column are all connected with a same second electrode line;

said third electrodes in a same row are all connected with a same third electrode line.

10. A display device comprising the liquid crystal display panel according to claim 1.

* * * * *